Patented May 7, 1935

2,000,892

UNITED STATES PATENT OFFICE 2,000,892

PROCESS OF CANNING CORN

Harold R. Lewis, Hoopeston, Ill.

No Drawing. Application August 15, 1933,
Serial No. 685,278

12 Claims. (Cl. 99—8)

This invention relates to a new method of canning green corn and particularly to a method whereby two different and distinct styles of corn thus effecting the desired separation.

At the present time there are two general styles of green corn packed, whole grain corn which comprises the whole kernels cut from the cob and cream style corn which comprises a splitting up of the kernels and a scraping of the cob which produces a corn having small pieces of kernels and considerable pulp and juice intermixed to form a somewhat thick creamy mass.

The cream style corn has been packed for many years and is practically the only style that was packed for many years. In producing this kind of pack the ears of corn as received from the field are sometimes sorted for maturity and cut separately to produce two grades of cream corn, but many times the ears are run directly to the cutters as they come from the field. The cutting machines slit the kernels, cut off portions and then scrape the cob to get all of the pulp and juices, this mass is then mixed with a brine or syrup and agitated to produce a uniform consistency and is then heated and placed in the cans.

Where the ears are sorted for maturity before cutting, two grades of cream style corn may be produced, that made from the most tender corn and another grade made from the more mature corn.

In producing whole grain corn the kernels are cut whole from the cob, blanched to set the kernel contents, washed and placed in the cans. Many canners produce two grades of whole grain corn.

When the corn is received from the field the ears are sorted for maturity, the young and tender ears used to produce the better grade and the more mature ears to produce a lower grade. In each instance the sorted ears are handled in substantially the same manner, being cut separately, blanched, washed or not as may be necessary and placed in the cans.

Usually the kernels are cut as closely to the cobs as possible to get the whole kernels, but sometimes the kernels are not cut so closely to the cobs which leaves part of the kernels and some of the pulp and juices on the cob which is thrown away with the cobs.

The improved method of canning green corn forming the subject of this invention comprises producing both the cream style and whole grain corn from the same ear and thus save the juices and pulp that was heretofore lost when cutting whole grain corn, and greatly improving the cream style corn without additional expense or labor.

With this improved method the corn may be brought into the plant without so much regard to its maturity, although it will still be desirable to harvest it in fairly uniform maturity. The husking, washing and trimming operations will be substantially the same but it will not be necessary to sort the corn for maturity before cutting it from the cobs.

In this manner of handling the husked ears would pass through the usual trimming operation, which comprises cutting off the ends, then into a blanching step if thought desirable, and then to the cutting machines where both the tender ears and the more mature ears are cut promiscuously as they come, with the result that the cut product would be mixed with tender kernels and mature kernels.

If the canner desired whole grains comprising only the top portions of the kernels then the remaining kernels and pulp on the cobs will be scraped off in a section of the cutting machine and go into the cream style pack.

The tendency at the present time is to cut only the top half or so of the kernels for the whole grain pack. On Country Gentleman corn which has rather a long kernel, shallow cut kernels make a very beautiful pack, far more tender and better in appearance than deep cut kernels, and thus the grade is stepped up and a better price obtained.

With this new method of handling the remaining parts of kernels and pulp are scraped off for the cream style pack and thus none of the kernel is lost.

Now that the kernels are cut from the cob, and it is to be understood that the cut kernels and the scraped portions are kept separate at the cutting machines, the mature kernels must be separated from the more tender kernels so as to get the tender out for the highest grade pack. It being understood that the usual blanching and washing steps are employed as usual if thought desirable.

I have discovered that the mass of cut kernels comprising the mature and the tender kernels mixed promiscuously into a mass may be separated by a flotation method that will separate the tender kernels from the mature kernels in a much better manner than trying to separate the ears for maturity before cutting the kernels from the cobs.

The mixed mass of kernels are placed in a suitable brine solution where the mature kernels will sink and the young and tender kernels will float thus effecting the desired separation.

The separated portions are then removed from the brine solution and the young and tender kernels are passed on to the whole grain canning line and the mature kernels are further treated and blended with the scraped portions of the ears to make a much better grade of the cream style pack.

In this blending operation the sinker kernels or caps, representing the hard, over-mature and mature kernels, would be run directly to the cream style pack, or if too tough it might be found advisable to run them through a recutting machine to cut them into smaller pieces and then a certain quantity of the tender kernels blended in with the scrapings from the cobs and the recut kernels to make up the cream style pack. This method makes it possible to maintain almost perfect uniformity in the cream style pack. It is now obvious that eliminating all of the hard and mature kernels from the whole grain pack will step up its quality and in addition if some of the tender kernels are recut and blended with the recut hard kernels and the scrapings from the cobs the cream style pack will be improved in quality as well as tenderness and flavor.

This new method makes it possible to produce real fancy whole grain corn and real fancy cream style corn from field run corn regardless of any slight variation in maturity. It will eliminate a lot of sorting labor, except that of possibly sorting out undesirable ears just after the husking, will speed up the cannery operations, simplify the machinery lineup, and in other ways will be of tremendous advantage to the corn canners. In addition the canner will get the maximum possible yield from his corn crop with practically no waste because all of the cobs will be scraped.

It is therefore a principal object of the invention to produce two styles of canned corn from the same ear.

It is also an object of the invention to produce a higher grade of whole grain corn.

It is also an object of the invention to produce a higher grade of cream style corn.

It is also an object of the invention to produce a grade of cream style corn that has blended therein portions of hard mature kernels, portion of young and tender kernels and pulp scraping from the cob to make a more uniform, more tender, and better flavored cream style corn.

It is also an object of the invention to produce two distinct packs of corn of highest grade and quality from the variable corn as received from the field.

It is also an object of the invention to produce two distinct packs of corn from the same ears by cutting the kernels from the ears without presorting, mixing the kernels and then after cutting separate the tender and young kernels from the hard and mature kernels by a flotation process.

It is also an object of the invention to produce two distinct packs of green corn from the same ears wherein the top portions of the kernels are cut from the ears to produce the whole grain pack and a portion of the cream style pack by a blending operation comprising separating the mass of cut kernels to isolate the hard and mature kernels, then recutting the hard kernels and mixing with the scrapings of the cobs and recutting some of the tender kernels and mixing with the recut hard kernels and the scrapings from the cobs to produce a higher grade of cream style corn.

Further objects and advantages may be inherent in the method and applicant reserves the right to claim all such objects and advantages as have not been recited.

In the previous methods of preparing and canning whole grain corn where only the tops of the kernels were cut off to give a small kernel product the remaining portions of the kernels including some of the pulp, milk and the germ, or as termed in the industry, the chits, were lost with the cobs, because there was no cutting machine that would cut the whole kernels and then scrape the remainder of the kernel contents from the cobs. There have been corn cutting machines on the market for cutting the corn from the cob and scraping the cob but the combined cuttings were all mixed into a mass as they came from the cutters, and all went into the "cream style" corn, no provision was made or needed for keeping the cuttings separate from the scrapings.

While the term cuttings is here used it should be mentioned that the kernels were not cut in the same manner as are the kernels cut in present day machines for producing the "whole grain" pack. In the older machines the cutters were mostly stationary and had more or less of a scraping action so that the bulk of the kernels were more or less mashed and pulpy in appearance and after cooking in the final mixture were practically all disintegrated to form the "cream style" corn.

In the older machines also, the ears had to be fed into the cutters by means of spur wheels that actually mashed into the kernels to get a sufficient grip on the ears to force them through the cutters, which were usually stationary. In the modern cutting machines the ears may be fed to the cutters without any kernel mutilation at all, since in some machines no spur feed devices are used for feeding the ears to the cutters, and in these later machines the cut kernel tops are all intact and not mutilated in the least, so that the "whole grain" product produced thereby is perfect as far as mutilation of the kernels is concerned.

A liquid separating medium has been mentioned as the means for separating the hard from the more tender kernels and such a solution would probably be used, but applicant wishes to point out that there are other possible means of separation that might be employed. For example the hard and more mature kernels being heavier than the young and tender kernels would be influenced less with a blast of air blown transversely of a stream of falling kernels which would have the effect of deflecting the hard and mature kernels less than the young and tender kernels and thereby separation might take place sufficient to drop the hard and mature kernels in one receptacle and the young and tender kernels in another receptacle. Also in many instances the hard and more mature kernels might be larger in size than the young and tender kernels and thus separation might be effected by a screening method.

While the liquid separating solution might be the preferred method of separation and the one mostly used applicant wants it understood that any method of separation that will isolate the young and tender kernels from the hard and mature kernels, even if the separation is not as perfect as with a brine solution, falls within the scope of his invention.

Applicant also wishes to mention that blanching the ears before the kernels are cut therefrom, or blanching the cut kernels immediately after cutting to seal the kernel contents against loss during the washing step, or otherwise, may or may not be used or desired by different canneries, and that therefore an entire elimination of the blanching step or the use of it does not change or affect his method, and so with the washing step after the kernels are cut, some canneries may desire to wash the cut kernels and in other sections of the canning industry the corn comes so clean from the huskers that washing is not necessary, and therefore the entire elimination or the use of the washing step does not change or affect the method, elimination of these steps in a canning process may affect the quality in some instances but a commercially satisfactory pack may be produced without them.

Applicant has used the expression, "field run corn" and wishes to say that this expression does not necessarily mean that all of the corn coming in from the field is suitable for his process of canning or for any other process. There probably will never be a time when it becomes unnecessary to do some culling. Some years the corn is badly infested with cut worms and other insects and many of the ears after husking are found to be unsuitable for canning and are eliminated, and sometimes corn in some parts of a field matures so much ahead of the rest of the field that it is much past the canning stage and has to be eliminated, so that in using the expression "field run corn", sweet corn of proper grade and condition for canning is meant whether some of the corn harvested is eliminated or not. The best of the crop selected would be "field run corn" in the sense used in this application.

What I claim as new and desire to secure by Letters Patent is:

1. The method of preparing and canning different grades or styles of green corn from field run corn, which includes severing the top portions of the kernels from the cobs, then removing the remaining portions of the kernels from the cobs and maintaining them separate from the tops, subjecting the kernel tops to a grading operation in a suitable liquid bath wherein the heavier kernel tops will sink and the lighter ones float, removing the lighter and heavier kernel tops in separate groups, mixing the heavier group of kernel tops with the kernel portions last removed from the cobs, and separately canning the mixed corn and the lighter kernel tops.

2. The method of preparing and canning different grades or styles of corn from field run corn, which includes the steps of cutting the top portions of the kernels from the cobs, then scraping the cobs to remove the remaining kernel contents therefrom, maintaining the cut kernel tops and scrapings separate, subjecting the kernel tops to a grading operation in a suitable liquid bath wherein the heavier kernel tops will sink and the lighter ones float, removing the lighter and heavier kernel tops in separate groups, mixing the heavier group of kernel tops with the scrapings, and separately canning the mixed corn and the lighter kernel tops.

3. The method of preparing and canning "whole grain" and "cream style" corn from field run corn, which includes the steps of severing the kernels to a substantial depth to produce cut kernels of the character known to the art as "whole grain", then scraping the cobs to remove the remaining kernel starches, milk and chits from the cobs in "cream style", maintaining the cut kernel tops and the scrapings separate, subjecting the kernel tops to a grading operation in a suitable liquid bath wherein the heavier ones will sink and the lighter ones float, removing the lighter and heavier kernel tops in separate groups, mixing the heavier group of kernel tops with the "cream style" scrapings, and separately canning the "cream style" mixture and the lighter "whole grain" kernel tops.

4. The method of preparing and canning different grades or styles of corn from field run corn, which includes the step of cutting the top portions of the kernels from the cobs, then scraping the cobs to remove the remaining kernel contents therefrom, maintaining the cut kernel tops and scrapings separate, subjecting the kernel tops to a grading operation in a suitable liquid bath wherein the heavier kernels will sink and the lighter ones float, removing the lighter and heavier kernel tops in separate groups, mixing the heavier group of kernel tops with a portion of the lighter group with the scrapings and separately canning the mixed corn and the remaining portion of the lighter kernel tops.

5. The method of preparing and canning different grades or styles of corn from field run corn of varying maturity, which includes the steps of blanching the ears to set the kernel contents, then cutting the larger portion of the kernel tops from the cobs, then scraping the cobs to remove the remaining kernel contents therefrom, maintaining the cuttings and scrapings separate, subjecting the kernel tops to a grading operation in a suitable liquid bath wherein the heavier kernel tops will sink and the lighter ones float, removing the lighter and heavier kernels in separate groups, recutting the heavier kernel tops and mixing them with the scrapings from the cobs and separately canning the mixture and the lighter kernel tops.

6. The method of preparing and canning sweet corn of varying maturity which includes the steps of cutting the tops from the kernels for a "whole grain" product, scraping the remaining kernels from the cobs for a "cream style" product, placing the mass of mixed kernel tops into a separating medium to separate the young and tender kernels from the hard and mature kernels, removing the separations in separate groups, mixing the group of hard and mature kernel tops with the scrapings from the cobs to complete the "cream style" grade, and canning the mixture of hard tops and scrapings, and separately canning the group of young and tender kernel tops as the "whole grain" grade.

7. The method of preparing and canning sweet corn of varying degrees of maturity including the steps of cutting the kernels from the cobs, scraping the residue of kernels including milk, pulp and chits from the cobs, maintaining these products separate, subjecting the cut kernels to a separation step where the young and tender kernels will separate from the harder and more mature kernels, mixing the harder and more mature kernels with the cob scrapings and a portion of the young and tender kernels to complete the "cream style" mix, and canning the remaining young and tender kernels as the "whole grain" mix.

8. The method of preparing and canning sweet corn of varying degrees of maturity including the steps of cutting a portion of the kernels from the cobs, scraping the remaining portions of the kernels and contents from the cobs, separating the young and tender kernel portions from the hard and mature kernel portions, recutting the hard and mature kernel portions and mixing them with the cob scrapings to form the "cream style" mixture, canning this mixture and separately canning the remainder of the cut kernel portions.

9. The method of preparing and canning two different grades of sweet corn from the same ears comprising the steps of husking the corn, blanching the ears to set the kernel contents, cutting the tops of the kernels from the cobs, scraping the remaining residue of kernels from the cobs, subjecting the kernel tops to a separation step to separate the young and tender kernels from the harder and more mature kernels, mixing the harder and more mature kernel tops with the cob scrapings and canning the mixture, and separately canning the young and tender kernel tops.

10. The method of preparing and canning sweet corn and producing two grades or styles of corn from the same ears comprising the steps of husking the corn, cutting the kernels from the cobs, scraping the residue of kernels from the cobs, blanching the cut kernels to set and seal the kernel contents, subjecting the blanched kernels to a separation step to separate the hard and mature kernels from the mass, mixing this separation with the portions scraped from the cobs, and canning the mixture and separately canning the remaining cut kernels.

11. The method of preparing and canning sweet corn and producing two styles or grades of corn from the same ears comprising the steps of husking the corn, blanching the ears to set the kernel contents, cutting the tops of the kernels from the cobs, scraping the remaining kernel contents and the chits from the cobs, maintaining the two products separate, subjecting the kernel tops to a separation step to separate the hard and mature kernel tops from the young and tender kernel tops, recutting the hard and more mature kernel tops and mixing with the scraped portions to form the "cream style" of corn and canning this mixture, and separately canning the remainder of the cut kernel tops as the "whole grain style".

12. The method of preparing and canning two different grades or styles of sweet corn from the same ears comprising the steps of husking the ears, blanching the ears, cutting the tops of the kernels from the cobs, scraping the remainder of the kernels and chits from the cobs, washing the cut kernels, subjecting the washed kernels to a separation step to separate the hard from the young and tender kernel tops, recutting all of the hard kernel tops and a portion of the young and tender kernel tops and mixing them with the scraped portions to form the "cream style" pack, and canning the remaining cut kernel tops as the "whole grain" pack.

HAROLD R. LEWIS.

CERTIFICATE OF CORRECTION.

Patent No. 2,000,892.                                                    May 7, 1935.

HAROLD R. LEWIS.

It is hereby certified that error appears in the printed specification of the above numbered patent requiring correction as follows: Page 1, first column, line 4, for the words "thus effecting the desired separation" read are produced from the same ear; and that the said Letters Patent should be read with this correction therein that the same may conform to the record of the case in the Patent Office.

Signed and sealed this 16th day of July, A. D. 1935.

Leslie Frazer (Seal)                                                          Acting Commissioner of Patents.